United States Patent [19]
Knaebel

[11] Patent Number: 5,711,926
[45] Date of Patent: Jan. 27, 1998

[54] PRESSURE SWING ADSORPTION SYSTEM FOR AMMONIA SYNTHESIS

[76] Inventor: Kent S. Knaebel, 8000 McKitrick Rd., Plain City, Ohio 43064

[21] Appl. No.: 649,122

[22] Filed: May 14, 1996

[51] Int. Cl.$^6$ .............................. B01D 53/047; C01C 1/04
[52] U.S. Cl. .................................................. 423/359; 95/128
[58] Field of Search .............................. 423/359; 95/128

[56] References Cited

U.S. PATENT DOCUMENTS

| | | | |
|---|---|---|---|
| 1,319,663 | 5/1919 | Davis et al. | 423/359 |
| 3,702,525 | 11/1972 | Simonet et al. | |
| 4,104,039 | 8/1978 | Kuri et al. | 55/23 |
| 4,537,760 | 8/1985 | Lavie | 423/359 |
| 5,160,512 | 11/1992 | Talu | 55/28 |
| 5,230,877 | 7/1993 | Eimer et al. | 423/359 |
| 5,626,650 | 5/1997 | Rodriguez et al. | 95/128 |

FOREIGN PATENT DOCUMENTS 3-238019   2/1990   Japan ......................... 95/128

*Primary Examiner*—Wayne Langel
*Attorney, Agent, or Firm*—Mueller and Smith, LPA

[57] ABSTRACT

The present invention is directed to a catalytic process for the synthesis of ammonia in an ammonia synthesis reactor wherein a dilute ammonia stream is withdrawn from the reactor and subjected to a treatment step to concentrate ammonia adsorbed (or extracted) from said dilute ammonia stream.

Specifically, the invention is an improvement in the ammonia concentration treatment step. This improvement includes passing the dilute ammonia stream from the reactor into an adsorber in which is housed particulate adsorbent effective in adsorbing ammonia from the dilute ammonia stream passed through the adsorber. Desirably, adsorber conditions include a pressure close to those prevailing in the dilute ammonia stream withdrawn from the reactor with the temperature being as low as that of the feed to the reactor. Next, an effluent stream diminished in ammonia content is withdrawn from the adsorber. Finally, enriched ammonia is recovered from the adsorber. Such ammonia recovery from the adsorber may include a rinse step in which enriched ammonia is admitted to the adsorber while withdrawing unadsorbed feed from the interstices of the adsorber, conventional blowdown where ammonia is desorbed, a low pressure purge with recycled dilute ammonia stream, and re-pressurization of the adsorbent bed with additional recycled dilute ammonia stream so that the adsorber is in condition for reuse in the adsorbing step of the process. Desirably, multiple adsorbers operating in parallel are envisioned for use with the reactor in a continuous process.

6 Claims, 1 Drawing Sheet

5,711,926

1

PRESSURE SWING ADSORPTION SYSTEM FOR AMMONIA SYNTHESIS

BACKGROUND OF THE INVENTION

The present invention relates to the synthesis of ammonia and more particularly to a novel pressure swing adsorption system to recover ammonia from the synthesis gas.

Ammonia, $NH_3$, has been commercially important since the early 1900s and is reported to be the second largest chemical in tonnage and first in value of production. The first practical breakthrough in the large-scale synthesis of ammonia resulted from the work of Fritz Haber (Germany, 1913) who found that nitrogen and hydrogen could be directly combined in the presence of a catalyst system composed of iron oxide with small quantities of cerium and chromium under reaction conditions of about 550° C. and 200 atmospheres. This process was adapted for industrial-quantity production by Karl Bosch (due to the need for explosives during World War I), who received one-half of the 1931 Nobel prize for chemistry in recognition of these achievements. Thereafter, many improved schemes based on the Haber-Bosch process were implemented commercially.

The principal features of an $NH_3$ synthesis process are the converter design, operating conditions, method of product recovery, and type of recirculation equipment. A review of various of these processes can be found in Considine, ed., *Chemical and process technology encyclopedia*, pp 107–114, McGraw-Hill Book Company, New York, N.Y. (1974). See also, Austin, *Shreve's Chemical Process Industries*, Fifth Edition, McGraw-Hill Book Company, New York, N.Y. (1984), the disclosures of both references being expressly incorporated herein by reference.

Conventionally, $NH_3$ recovery is carried out by condensation of $NH_3$ from the reactor off-gases. This is costly because $NH_3$ is dilute, and because the stream must cooled, sometimes under refrigeration. Subsequently, the unreacted gas mixture (plus as much as 4% unrecovered $NH_3$) is re-heated to the reaction conditions.

The present invention is aimed at improving the $NH_3$ recovery step in $NH_3$ synthesis.

SUMMARY OF THE INVENTION

The present invention is directed to a catalytic process for the synthesis of ammonia in an ammonia synthesis reactor wherein a dilute ammonia stream (e.g., 5% to 30% by volume) is withdrawn from the reactor and subjected to a treatment step to concentrate ammonia in said dilute ammonia stream. Specifically, the invention is an improvement in the ammonia concentration treatment step. This improvement includes passing the dilute ammonia stream from the reactor into an adsorber in which is housed particulate adsorbent effective in adsorbing ammonia from the dilute ammonia stream passed through the adsorber. Desirably, adsorber conditions include a temperature and pressure close to those prevailing in the dilute ammonia stream withdrawn from the reactor. The temperature may be somewhat lower if a thermal energy recovery unit is inserted between the reactor and the adsorber. Next, an effluent stream diminished in ammonia content is withdrawn from the adsorber. Finally, enriched ammonia is recovered from the adsorber. Such ammonia recovery from the adsorber may include a rinse step in which enriched ammonia is admitted to the adsorber while withdrawing unadsorbed feed from the interstices of the adsorber, conventional blowdown where ammonia is desorbed, a low pressure purge with recycled dilute ammonia stream, and re-pressurization of the adsorbent bed with additional recycled dilute ammonia stream so that the adsorber is in condition for reuse in the adsorbing step of the process. Desirably, multiple adsorbers operating in parallel are envisioned for use with the reactor in a continuous process.

2

Advantages include the ability to recover ammonia at or near synthesis conditions (high pressure and temperature) which reduces the cost of the overall process. Another advantage is the ability to recover a nearly pure ammonia product from the adsorber. These and other advantages will be readily apparent to those skilled in the art based on the disclosure herein.

BRIEF DESCRIPTION OF THE DRAWING

The drawing is a simplified flow diagram of how the invention can be practiced. Instrumentation, controls, feeds, tanks, fittings, pumps, valves, and other auxiliary appurtenant equipment are not shown, but are to be provided where necessary or desirable in conventional fashion. Materials of construction of this process are conventional. Thus, corrosion-resistant materials, such as austenitic stainless steel, glass-lined steel, or the like, can be used where necessary. Concrete and steel can be used where corrosion or erosion is inconsequential. Various of the tanks and lines illustrated can be in multiple, series, cascade, or parallel connected, for additional treating time and/or capacity.

DETAILED DESCRIPTION OF THE INVENTION

Figure 1:
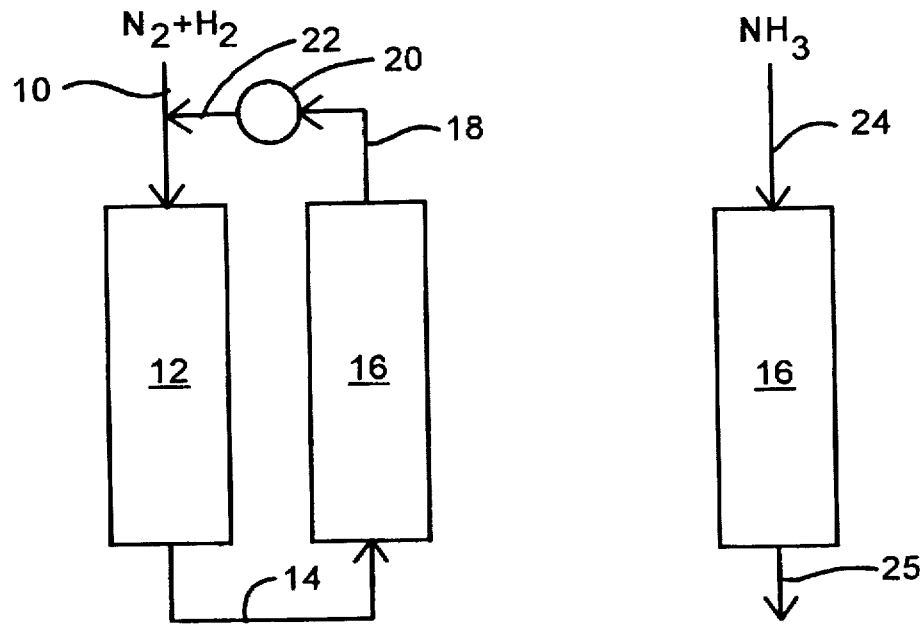
Figure 1:
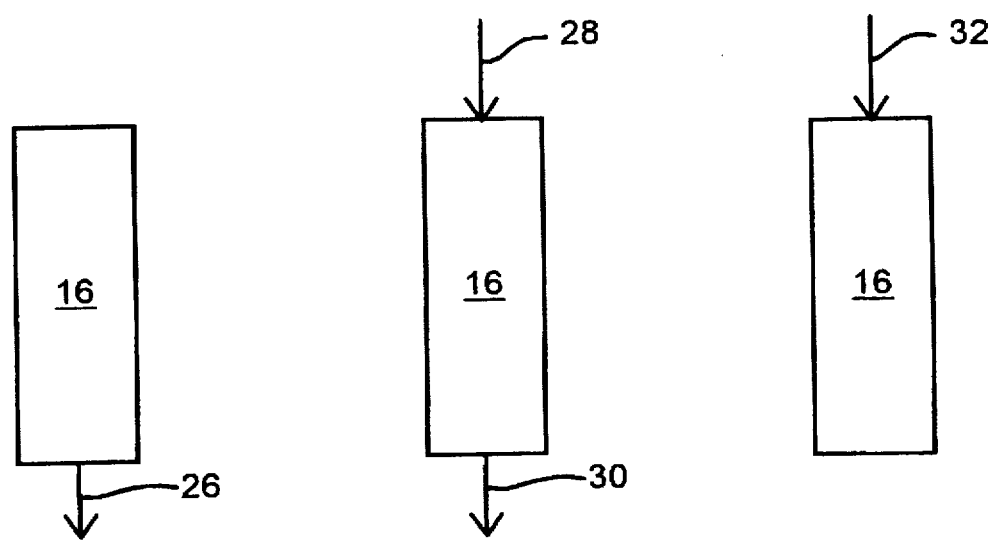

The pressure swing adsorption (hereinafter, "PSA") cycle disclosed herein was designed to recover essentially pure $NH_3$ as a "heavy" (meaning "more-strongly adsorbed") product and recycle unreacted nitrogen ($N_2$) and hydrogen ($H_2$) as a "light" product, possibly contaminated with residual unrecovered $NH_3$. The basic PSA cycle can be seen by referring to the drawing. It will be observed that in Step 1 $N_2$ and $H_2$ feedstock 10, along with a recycle stream described below, is fed to reactor 12. Preparation of feedstock 10 is conventional as described in the background section above. Too, operation of reactor 12 under catalytic conditions for formation of $NH_3$ is conventional in the art as described above.

Of importance for purposes of the present invention is reactor off-gas or reactor product stream 14 withdrawn from reactor 12, which contains $NH_3$ product and unreacted $N_2$ and $H_2$, along with minor amounts of contaminants indigenous to feedstock 10 resultant from its method of formation, e.g., argon, when air is a reactant in the formation of feedstock 10. Off-gas stream 14 typically will contain between about 5% and 30% $NH_3$ resultant from typical current commercial $NH_3$ plants.

In order to materially reduce the cost of $NH_3$ recovery by improving yields under less costly recovery conditions, off-gas stream 14 is passed into adsorber 16 in which is retained an adsorbent bed of particulate adsorbent effective in adsorbing $NH_3$ from stream 14. Advantageously, adsorber 16 is operated under conditions not substantially different from those prevailing in reactor 12 in order to reduce $NH_3$ recovery costs. There may be a cooler (steam generator) to cool the off gas from the reactor effluent condition (e.g., 400° C.) to that of the reactor feed (e.g., 250° C.). Typical $NH_3$ reactor conditions comprehend a temperature ranging from about 200° to 400° C. at pressures ranging from between about 20 and 200 atmospheres. In adsorber 16, the adsorbent bed strips $NH_3$ leaving a cleansed stream containing at most a minor amount of residual $NH_3$. Effluent 18 from adsorber 16 contains $N_2$ and $H_2$ in roughly a stoichiometric ratio. Effluent 18 then is passed into blower 20, to compensate for the change in pressure in the adsorber plus pipes and fittings, with cooled effluent 22 combined with feedstock 10 thereafter.

The inventive PSA process from this point forward operates independently of reactor 12. Accordingly, use multiple adsorbers like adsorber 16 will become highly advantageous for continuous commercial operations. The next step of the PSA process has been determined to substantially positively promote the process. In Step 2, substantially pure $NH_3$ stream 24 is passed into adsorber 16 to rinse the adsorbent bed of residual gas from stream 14 (e.g., $NH_3$, $H_2$, and $N_2$) previously fed to adsorber 16. Effluent 25 ($NH_3$, $N_2$, and $H_2$) from column 16 in Step 2 may be combined with stream 14 to an adjacent column. In Step 3 or the "blowdown" step, then, pressure is released in adsorber 16 and substantially pure $NH_3$ is desorbed from the adsorbent bed housed within adsorber 16 and vented via line 26 for recovery. Effluent 26 withdrawn from the adsorbent bed in adsorber 16 as the pressure is reduced, is the major product, part of which is returned to the system as stream 24. At the lowest operating pressure, a small fraction of adsorbed $NH_3$ in the adsorbent bed remains in its adsorbed state.

Optional step 4 is a purge step that can use recycled light product feed 28, e.g., from line 18, to drive residual ammonia from the adsorbent bed housed within adsorber 16 for its removal via line 30. This constitutes a relatively minor addition of ammonia to the overall product. Omitting this purge step is justified by the fact that it is not necessary to recover a very pure light product, i.e., as stream 18. Omission of step 4 allows the cycle to be carried out more quickly and reduces the complexity of the interconnections and synchronization and, therefore, may drive the economics favorably. Finally, step 5 involves the repressurization of adsorber 16 with additional recycled light product in feed line 32, e.g., from line 18 or 22, so that adsorber 16 is in condition to be placed back on line in fluid communication with reactor 12. From the foregoing description it will be seen that use of multiple adsorbers piped appropriately with reactor 12 will be desirable for continuous operation at plant facilities.

Using an H-Y zeolite adsorbent and based on studies by Shiralkar and Kulkarni, *J. Coll. Interf. Sci.*, 108, 1–10 (1985) which provide multiple isotherms and pressures, isotherms at 60° and 210° C. were fit using a dual mode equation as described by Knaebel, et al., "A Novel Pressure Swing Adsorption System for Ammonia Synthesis", *Proceedings of the Fifth International Conference on Fundamentals of Adsorption*, Pacific Grove, Calif., May 13–18, 1995, presented May 15, 1995 (to be edited by M. Douglas LeVan and published by Kluwer Academic Publications, Boston, Mass., 1996). These same authors also report adsorption isotherm parameters used for extrapolation of ammonia and nitrogen isotherm data on H-Y zeolite. For the inventive cycle, the summary of simulation results to recover pure ammonia using H-Y zeolite, with a low pressure of 1 atmosphere. The following symbols are used: $y_F$, the feed mole fraction of ammonia; $P_H$ and $P_L$, the high and low pressures; T, the operating temperature; $R_B$ and $y_A$, the ammonia product recovery and mole fraction; and $R_B$ and $y_B$, the light product recovery and its mole fraction of residual ammonia.

TABLE I

| $y_F$ % $NH_3$ in Feed | $P_H$ atm. | T °C. | $R_A$ % $NH_3$ Recovery | $y_B$ $NH_3$ in Byproduct |
|---|---|---|---|---|
| 5.0 | 20 | 300 | 0.0 | 5.00 |
| | 40 | | 46.6 | 2.73 |
| | 80 | | 73.6 | 1.37 |
| 10.0 | 20 | 250 | 46.4 | 5.62 |
| | 40 | | 73.9 | 2.82 |
| | 20 | 300 | 48.1 | 5.45 |
| | 40 | | 74.7 | 2.73 |
| | 80 | | 87.5 | 0.37 |
| | 20 | 350 | 49.0 | 5.39 |
| | 40 | | 75.2 | 2.69 |

TABLE I-continued

| $y_F$ % $NH_3$ in Feed | $P_H$ atm. | T °C. | $R_A$ % $NH_3$ Recovery | $y_B$ $NH_3$ in Byproduct |
|---|---|---|---|---|
| | 80 | | 87.7 | 1.35 |
| | 20 | 400 | 49.6 | 5.30 |
| | 40 | | 75.4 | 2.66 |
| | 80 | | 87.9 | 1.33 |
| | 20 | 500 | 50.4 | 5.22 |
| | 40 | | 75.8 | 2.62 |
| | 80 | | 88.0 | 1.31 |
| 15.0 | 20 | 300 | 67.3 | 5.45 |
| | 40 | | 84.1 | 2.73 |
| | 80 | | 92.1 | 1.37 |
| 20.0 | 20 | 300 | 76.9 | 5.45 |
| | 40 | | 88.8 | 2.73 |
| | 80 | | 94.4 | 1.37 |

Three principal trends are evident: performance improves significantly as $y_F$ and $P_H$ increase, but is very modestly affected (it improves) as T increases. Specifically, a proportionate increase in recovery occurs by increasing the feed ammonia content at a fixed feed pressure, as it does by increasing the feed pressure for a fixed feed composition. That is, a four-fold increase in $Y_F$, e.g., from 5 to 20% at $P_H$=20 atm, yields a nearly identical increase in recovery as a four-fold increase in $P_H$, e.g., from 20 to 80 atm at $y_F$=5%. Though not yet fully evaluated, it is believed that other adsorbents would function in the process as well, e.g., other zeolites, silica gels, and activated carbons.

I claim:

1. In a catalytic process for the synthesis of ammonia in an ammonia synthesis reactor wherein a dilute ammonia stream is withdrawn from said reactor and subjected to a treatment step to concentrate ammonia in said dilute ammonia stream, the improvement in said ammonia concentration treatment step which comprises the steps of:

(a) passing said dilute ammonia stream into an adsorber in which is housed particulate adsorbent bed effective in adsorbing ammonia from said dilute ammonia stream passed through said adsorber;

(b) withdrawing from said adsorber an effluent stream diminished in ammonia content; and (c) recovering ammonia from said adsorber by:

(1) rinsing said adsorber with substantially pure ammonia to recover residual dilute ammonia in said adsorber;

(2) followed by a blow-down step wherein the pressure in said adsorber is released to vent product ammonia therefrom.

2. The process of claim 1, wherein said pressure is released to about atmospheric pressure.

3. The process of claim 1, wherein said adsorber in step (a) operates at a temperature ranging from about 200° to 400° C. and at a pressure ranging from about 20 to 200 atmospheres.

4. The process of claim 1, wherein said adsorber houses a particulate adsorbent selected from the group consisting of a zeolite, a silica gel, and an activated carbon.

5. The process of claim 4, wherein said adsorber houses H-Y zeolite adsorbent.

6. The process of claim 1, wherein a plurality of said adsorbers are connected to said reactor.

* * * * *